(12) United States Patent
Hao et al.

(10) Patent No.: US 10,917,030 B1
(45) Date of Patent: Feb. 9, 2021

(54) ELECTRIC DRIVE SYSTEM WITH RECONFIGURABLE MACHINE WINDINGS

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Rashmi Prasad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/570,168

(22) Filed: Sep. 13, 2019

(51) Int. Cl.
*H02P 25/18* (2006.01)
*B60L 15/20* (2006.01)
*H02K 3/28* (2006.01)

(52) U.S. Cl.
CPC ............. *H02P 25/18* (2013.01); *B60L 15/20* (2013.01); *H02K 3/28* (2013.01)

(58) Field of Classification Search
CPC ..... Y02T 10/64; Y02T 10/70; Y02T 10/7072; H02T 10/72; B60L 240/421; B60L 15/20; H02P 25/18; H02K 3/28
See application file for complete search history.

(56) References Cited

U.S. PATENT DOCUMENTS

| | | | |
|---|---|---|---|
| 9,621,099 B1 | 4/2017 | Namuduri et al. | |
| 9,882,521 B2 | 1/2018 | Namuduri et al. | |
| 2014/0217946 A1* | 8/2014 | Kume | H02P 6/08 318/497 |
| 2015/0061423 A1* | 3/2015 | Nagao | H02K 11/21 310/52 |
| 2016/0141996 A1* | 5/2016 | Kim | B60L 50/15 318/497 |

* cited by examiner

*Primary Examiner* — Zoheb S Imtiaz
(74) *Attorney, Agent, or Firm* — Quinn IP Law

(57) ABSTRACT

An electric drive system includes a battery pack, a power inverter module ("PIM"), an electric machine, a switching circuit, and a controller. The electric machine has three or more phase legs. The PIM has a DC-side connected to the battery pack, and an alternating current ("AC")-side connected to the electric machine. The switching circuit includes AC switches. For each phase leg the circuit also includes three or more winding sections each electrically connectable to or disconnectable from the PIM via the AC switches. The controller commands a binary switching state of each respective AC switch based on the rotary speed to implement one of four different speed-based operating modes of the electric machine, and to thereby vary a conductive path from the PIM to the electric machine through one or more of the connected winding sections.

18 Claims, 4 Drawing Sheets

| OM | SA11 | SB11 | SC11 | SA12 | SB12 | SC12 | SA21 | SB21 | SC21 | SA22 | SB22 | SC22 | (A1 + A2 + A3)<br>(B1 + B2 + B3)<br>(C1 + C2 + C3) | (A1 + A3)<br>(B1 + B3)<br>(C1 + C3) | (A2 + A3)<br>(B2 + B3)<br>(C2 + C3) | (A3), (B3), (C3) |
|---|---|---|---|---|---|---|---|---|---|---|---|---|---|---|---|---|
| LS | X | X | X | O | O | O | X | X | X | O | O | O | | | | |
| MS1 | X | X | X | O | O | O | O | O | O | X | X | X | | | | |
| MS2 | O | O | O | X | X | X | X | X | X | O | O | O | | | | |
| HS | O | O | O | X | X | X | O | O | O | X | X | X | | | | |

Fig-3

ELECTRIC DRIVE SYSTEM WITH RECONFIGURABLE MACHINE WINDINGS

INTRODUCTION

Rotary electric machines are commonly embodied as electric motors, electric generators, or combined motor-generator units. For instance, a high-voltage electric traction motor may be used as a prime mover within a transmission or an electric drive unit ("EDU"). Alternatively, motor output torque produced by the electric machine operating in a power generating mode may be used to produce electricity, which in turn may be used to power one or more electrical devices and/or to recharge a direct current ("DC") battery pack.

Electric drive systems may employ a polyphase/alternating current ("AC") electric machine that includes a rotor shaft mounted to a rotor hub. In some machine configurations, permanent magnets are surface-mounted to and/or embedded within laminations of the rotor hub. A stator that is concentrically arranged with the rotor has multiple stator teeth. Stator slots defined between adjacent stator teeth are wound with wire or bar-style conductors to form individual stator windings. A rotating magnetic field results when the stator windings are energized by an AC input voltage. Interaction of the stator and rotor fields ultimately causes rotation of the rotor shaft.

Electrical systems using an AC electric machine in conjunction with DC battery packs use a power inverter module ("PIM") to convert a DC input voltage to an AC output voltage, as well as to rectify an AC input voltage, with PIM operation controlled in an operating mode-specific manner. The PIM, which is situated on a high-voltage bus between the battery pack and the electric machine, has multiple pairs of high-voltage semiconductor AC switches, with each switch having an independently-controlled ON/OFF switching state. The switching states are controlled via pulse width modulation ("PWM"), pulse-density modulation ("PDM"), or other switching control signals. An ON switching state corresponds to a conducting/closed state of the semiconductor switch, while an OFF state corresponds to a non-conducting/open state. Thus, control of the switching states of the PIM switches in motoring or generating modes delivers current respectively to or from the individual phase leads of the electric machine.

SUMMARY

An electric drive system and method as described herein may be used to enhance the overall power, torque, and range capabilities of a polyphase/alternating current ("AC") electric machine in a fault-tolerant manner. In a representative embodiment, the electric drive system includes, in addition to the electric machine, a controller, a direct current ("DC") power supply, e.g., a battery pack, and a power inverter module ("PIM") that is electrically connected to the DC power supply. The electric machine, which is electrically connected to an AC-side of the PIM, is connected to or integrally formed with a switching circuit having bi-directional wind-bandgap ("WBG") semiconductor switches, or bi-directional silicon or silicon carbide semiconductor switches, also referred to below as "bidirectional AC switches", in addition to reconfigurable phase windings. That is, each phase winding, e.g., the A-phase, B-phase, and C-phase windings in an exemplary three-phase embodiment using nominal A, B, and C phases, is separated into three or more discrete winding sections. The controller delivers current to the electric machine in four or more different operating modes to thereby increase the available output torque from the electric machine at higher machine speeds, i.e., relative to possible torque capabilities using unitary phase windings. The number of operating modes is based on the number of winding sections, with four modes corresponding to three winding sections, and with additional modes being possible with additional winding sections.

As set forth herein, a "full" phase winding equivalent to the above-noted unitary phase winding is divided into three or more discrete winding sections. The full phase winding is fully constructed in a given phase leg of the electric machine when its three or more constituent winding sections are connected together in series, which occurs via mode-based switching state control of the individual AC switches. Similarly, a partial phase winding is constructed when at least one but fewer than all of the winding sections are interconnected in a given phase leg. The particular full or partial winding configuration is selected in real-time by the controller based on a rotary speed of the electric machine, e.g., a requested, commanded, or measured speed of a rotor thereof, or a related speed such as a wheel speed of a road wheel in an exemplary motor vehicle embodiment.

Also disclosed herein is a switching control method for use with the above-noted electric drive system. The exemplary circuit topology set forth herein enables four different speed-dependent machine operating modes, i.e., a low-speed mode, two medium-speed modes, and a high-speed mode. Moreover, each of the four distinct modes has a corresponding set of switching states of the AC switches and a corresponding speed threshold governing entry into the mode.

The electric drive system in an exemplary embodiment includes a DC battery pack, the electric machine, a controller, the PIM, and a switching circuit. The switching circuit includes a plurality of AC switches. For each of three or more phase legs of the electric machine, three or more winding sections are electrically connectable to or disconnectable from the battery pack and PIM by operation of the AC switches. In each respective one of the phase legs, with one of the winding sections of each of the phase legs forming a distal winding section relative to the PIM, each winding section other than the distal winding section is connected in series and in parallel with a respective first and second AC switch.

That is, for each respective winding section, the first AC switch for that winding section is in series with the winding section, while the second AC switch is in parallel with the same winding section. The distal winding section is characterized by an absence of the respective first and second AC switch. The controller is configured to command a binary switching state of each respective one of the AC switches based on a rotary speed of the electric machine to thereby implement one of four different speed-based operating modes, and to thereby vary a conductive path from the PIM to the electric machine through the winding sections.

In a non-limiting embodiment, the electric machine has three phase legs, three winding sections for each phase leg, and at least twelve AC switches.

The AC switches may be wide-bandgap ("WBG") or silicon switches, such as but not limited to Gallium nitride ("GaN"), Gallium oxide ("GaO"), Silicon carbide ("SiC"), Insulated-Gate Bipolar Transistor ("IGBT"), or Metal-Oxide Semiconductor Field Effect ("MOSFET") switches. Such AC switches may be integrated with the electric machine, or housed in a separate unit and connected between the PIM and the electric machine, or integrated with the PIM.

The speed-based operating modes include a low-speed operating mode, first and second medium-speed operating modes, and a high-speed operating mode. In the low-speed mode, all of the winding sections present in each phase leg are connected in series to each other and to the PIM at a first rotary speed of the electric machine via a first ON/OFF switching combination of the AC switches. In the first and second medium-speed modes, at least two but fewer than all of the winding sections for each respective phase leg are connected to the PIM at a second and third rotary speed of the electric machine, respectively, via a respective second and third ON/OFF switching combination of the AC switches. In the high-speed operating mode, only one of the winding sections in each phase leg is connected to the PIM at above the third rotary speed of the electric machine via a fourth ON/OFF switching combination of the AC switches.

The controller may optionally time an opening or a closing of each of the AC switches based on a zero-crossing of a phase current of the electric machine.

The winding sections may have a predetermined turn ratio configured to provide a predetermined power or torque from the electric machine.

The electric machine may be embodied as a three-phase electric machine having first, second, and third winding sections in each of three of the phase legs. The first winding section is closest to the PIM. The third winding section is a distal winding section. In such a configuration, the predetermined turn ratio of the respective first, second, and third winding sections may be 2:1:1.

The electric machine may have at least twice as many of the AC switches as a number of the winding sections in each respective one of the phase legs. For instance, a number (N) of the AC switches may be N=2(n−1)(m), where (n) is the number of the winding sections in each of the phase legs and (m) is the total number of the phase legs.

The electric machine may have at least four operating modes based on the number of winding sections, with the number of modes being equal to $2^{n-1}$. Thus, a simplified embodiment using three winding sections, i.e., n=3, would have a total of four operating modes.

The electric machine may be optionally coupled to road wheels and configured to propel a vehicle via rotation of the road wheels.

A method for controlling a polyphase electric machine in an electric drive system is also disclosed. The method includes providing, between a PIM and the electric machine, a plurality of AC switches and, for each of the three phase legs of the electric machine, three or more series-connectable winding sections. The method also includes determining a rotary speed of the electric machine via a controller, and commanding a binary switching state of each respective one of the AC switches based on the rotary speed to thereby implement one of four different speed-based operating modes of the electric machine, and to thereby vary a conductive path from the PIM to the electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a table describing corresponding states of various AC switches used within the exemplary circuit topology of FIG. 1.

Figure 1:
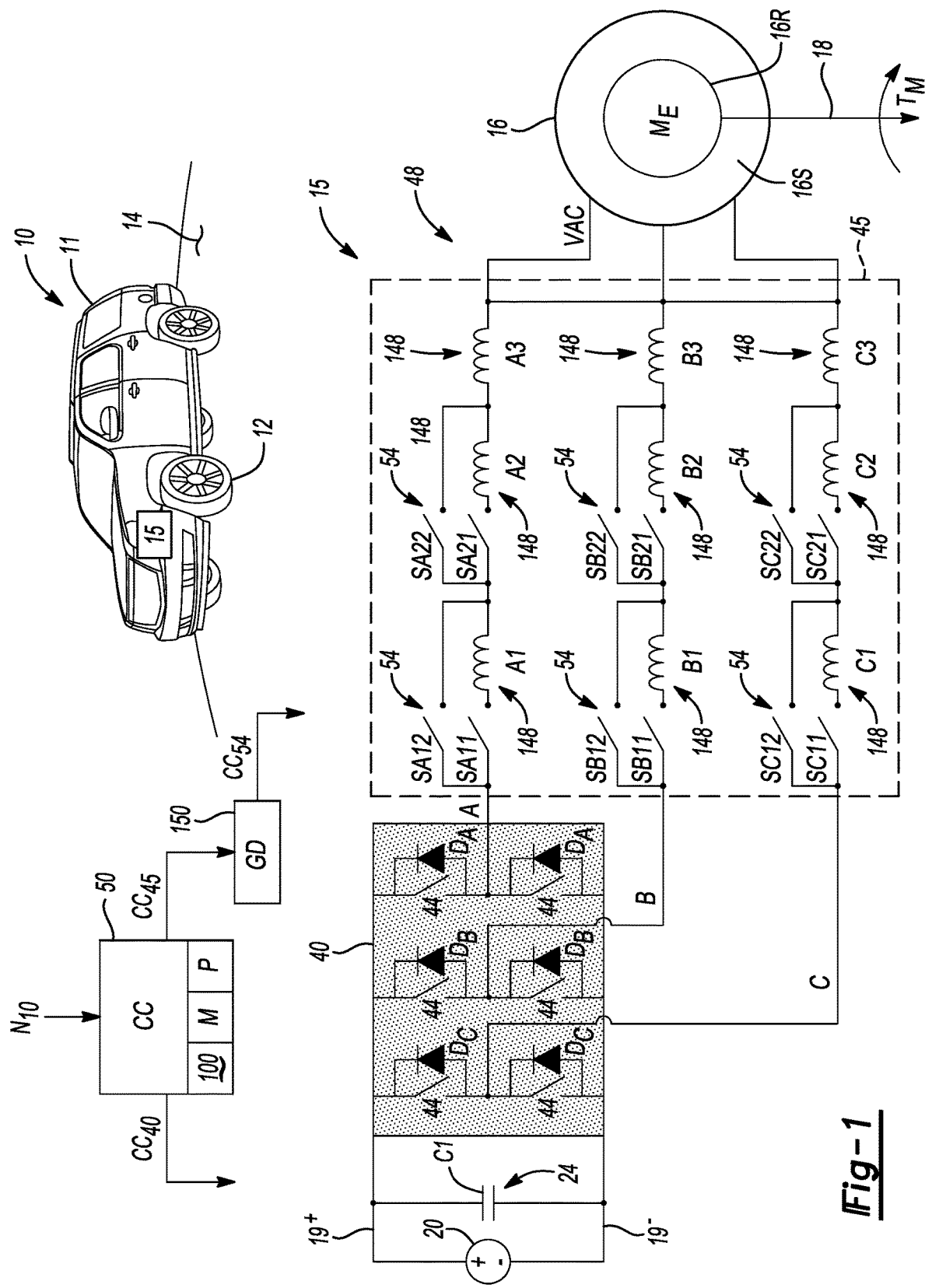
FIG. 1 is a schematic illustration of a motor vehicle having an electric drive system configured and controlled as set forth herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers refer to like components throughout the several views, FIG. 1 depicts a schematic vehicle 10 having a vehicle body 11 and an electric drive system 15. The vehicle 10 may be configured as a motor vehicle as shown, and therefore may be equipped with a set of road wheels 12 in rolling contact with a road surface 14. The electric drive system 15 includes an alternating current ("AC")/polyphase electric machine ("ME") 16 having a rotor 16R and a stator 16S, with the rotor 16R mechanically coupled to a rotor shaft 18. Thus, when phase windings or phase legs 48 of the stator 16S are energized, motor output torque (arrow $T_M$) is delivered via the rotor 16R to the road wheels 12 or another coupled load via the rotor shaft 18. Other suitable applications or platforms for the electric drive system 15 may be readily envisioned, including but not limited to stationary power plants, mobile platforms, and other types of land, air, or marine vehicles. For illustrative consistency, the vehicle 10 will be described herein after as a motor vehicle without limitation.

As described in detail below, the electric machine 16 has three or more electrical phases, and thus three or more corresponding phase legs 48 of the stator 16S. Each phase leg 48 is formed from three or more discrete winding sections 148 that, when connected in series in a given phase leg 48, together form a full phase winding. The winding sections 148 are selectively connected or disconnected, in series, in different combinations for a given phase leg 48. The connection of the winding sections 148 occurring automatically by action of a controller (CC) 50 based on an actual or requested rotary speed (arrow $N_{10}$) of the electric machine 16 and/or the motor vehicle 10. Control of the electric machine 16 to achieve the desired control response in such a speed-dependent manner is described below with reference to FIGS. 3-6.

When the electric machine 16 is energized via application of an AC/polyphase voltage ("VAC") to the individual phase legs 48, the motor output torque (arrow $T_M$) is generated and delivered to a coupled load, such as to the road wheels 12 to propel the vehicle 10 in the exemplary motor vehicle application. The electric machine 16 may be embodied as a three-phase/multi-phase motor or motor/generator unit in a simplified embodiment, with each of the phase legs 48 carrying a corresponding phase current. Alternatively, the electric machine 16 may have more than three electrical phases/phase legs 48, e.g., a five-phase or seven-phase machine, with the present teachings readily extendable to such configurations as will be readily appreciated by those of ordinary skill in the art.

The electric drive system 15 shown in FIG. 1 includes a direct current ("DC") battery pack 20 or other DC power supply, and a power inverter module ("PIM") 40. The DC battery pack 20 may include an application specific number of rechargeable battery cells, e.g., lithium ion or nickel metal hydride, and a capacitor ("C1") 24 arranged in electrical parallel with the DC battery pack 20. A battery output voltage is delivered to respective positive and negative voltage DC bus rails 19⁺ and 19⁻. The PIM 40 in turn is electrically connected to the DC bus rails 19⁺ and 19⁻, with the various electrical phases (e.g., A-phase, B-phase, and C-phase as shown) connected to corresponding phase legs 48 of the electric machine 16.

Within the depicted example circuit topology of FIG. 1, the PIM 40 includes semiconductor switches ("inverter switches") 44 arranged in upper and lower sets as shown, with the terms "upper" and "lower" referring to the inverter switches 44 connected to the positive and negative DC bus rails 19⁺ and 19⁻, respectively. The inverter switches 44, depicted schematically as mechanical switches for illustrative simplicity, may be variously embodied as voltage-controlled bipolar switching devices, e.g., in the form of insulated gate bipolar transistors ("IGBTs"), metal-oxide semiconductor field effect transistors ("MOSFETs"), or other suitable switches having a corresponding gate terminal to which a voltage signal is applied to change the binary ON/OFF conducting state of a given one of the inverter switches 44.

The PIM 40 is depicted as a half-bridge with its constituent inverter switches 44 paired with a corresponding diode $D_A$, $D_B$, or $D_C$ depending on the phase of the electric machine 16, i.e., electrical phases A, B, and C in the illustrated three-phase configuration. In this example three-phase topology, there are a total of twelve (12) AC switches 54, i.e., four (4) AC switches 54 per phase leg 48. As will be readily understood by those of ordinary skill in the art, the inverter switches 44 may be turned OFF or ON as needed at a high switching frequency, e.g., via pulse width modulation ("PWM"), pulse density modulation ("PDM"), or another switching control technique in order to rectify or convert the AC or DC bus voltages as needed.

With respect to the reconfigurable winding configuration of the electric machine 16, FIG. 1 shows a simplified three-phase embodiment in which the electric machine 16 has an integral switching circuit 45 that includes a set of high-voltage, bi-directional, wide-bandgap ("WBG") semiconductor switches or silicon semiconductor switches, hereinafter referred to as "AC switches" 54, in addition to the above-noted phase legs 48. Alternatively, the switching circuit 45 may be packaged external to the electric machine 16, e.g., disposed between the PIM 40 and the electric machine 16, or the switching circuit 45 may be integrated into the PIM 40 in different configurations.

The AC switches 54 for the A-phase leg 48 are respectively labeled SA11, SA12, SA21, and SA22 for clarity. Likewise, the B-phase AC switches 54 are labeled SB11, SB12, SB21, and SB22 and the C-phase AC switches 54 are labeled SC11, SC12, SC21, and SC22. Although depicted as simplified ON/OFF binary switches for simplicity, non-limiting exemplary variations of the AC switches include Silicon carbine ("SiC"), Gallium-nitride ("GaN"), or Gallium-oxide ("GaO") switches, IGBTs, or MOSFETs as noted above, a pair of which may be connected back-to-back to form a bi-directional modular switch. Such configurations provide the requisite high-voltage/low resistance capabilities for performing the described speed-based control functions. For example, the AC switches 54 may have switching times of less than 1 ms, and may be rated for currents of up to 600 A and voltages of up to 2000V or more depending on the requirements of the application.

Each of the phase legs 48, e.g., the A-phase, B-phase, and C-phase windings of the depicted exemplary three-phase embodiment of the electric machine 16, is separated into three or more of the winding sections 148, i.e., winding sections A1, A2, and A3 for the A-phase, winding sections B1, B2, and B3 for the B-phase, and winding sections C1, C2, and C3 for the C-phase. Configurations having more than three electrical phases could be similarly configured for each additional phase in excess of three.

Winding sections 148 that are located in closest proximity to the electric machine 16, i.e., farthest away from the PIM 40, are referred to herein as "distal" winding sections 148, and are not connected to an AC switch 54. In contrast, each of the remaining winding sections 148 includes a respective pair of AC switches 54 as shown, with one of the pair of AC switches 54 positioned in series with the windings section 148, e.g., switch SA11 for winding section A1, and the other AC switch 54 connected in parallel with/across the winding section 148, i.e., switch SA12 for the same winding section A1. Thus, each of the winding sections 148 in a given phase leg 48, other than the above-noted distal winding section 148, is connected in series and in parallel with respective first and second of the AC switches 54, with the distal winding section 148 characterized by an absence of a connection to the respective first and second AC switches 54. In other words, if one considers the various winding sections 148 of a given phase leg 48 from the perspective of the PIM 40 looking toward the electric machine 16, the winding section 148 that is proximate the electric machine lacks the two AC switches 54 that are connected to every other one of the winding sections 148 of that particular phase leg 48.

In the illustrated switching circuit 45, for instance, the A-phase winding section 148 (A1) located closest to the PIM 40 is connected in series with AC switch 54 (SA11), and also is connected in parallel with the AC switch 54 (SA12). Thus, if the AC switch 54 labeled SA11 were to be opened and the AC switch 54 labeled SA12 were to be closed, electric current flowing from the PIM 40 would bypass the winding section 148 (A1) through switch SA12. The same series-parallel pair arrangement of AC switches 54 is used for winding sections 148 labeled A2, B1, B2, C1, and C2. As noted above, the most distal winding sections 148, i.e., A3, B3, and C3 in the illustrated example topology of FIG. 1, have neither a series-connected AC switch 54 nor a parallel-connected AC switch 54.

One, two, or three of the three illustrated winding sections 148 are selectively connected in series to the PIM 40 for each respective electrical phase during four different speed-based operating modes of the electric machine 16, which varies a conductive path from the PIM 40 to the electric machine 16 through the winding sections 148. This is accomplished via switching control operation of the various AC switches 54, with the particular winding configuration selected in real-time by the controller 50 based on the speed ($N_{10}$), e.g., of the vehicle 10 such as a road speed, a rotational speed of the electric machine 16, or a function of both, whether requested, commanded, or measured. The controller 50, which is in communication with the electric machine 16 over a controller area network or other communication bus, may be configured as a single device or as a distributed control device.

Although omitted from FIG. 1 for illustrative simplicity, connectivity of the controller 50 to the electric drive system 15 and its constituent components may include transfer conductors and/or wireless control links or paths suitable for transmitting and receiving inverter switching control signals (arrow $CC_{40}$) to the semiconductor switches 44 of the PIM 40. A WBG gate drive ("GD") circuit 150 may be used in conjunction with the controller 50, or its functionality integrated into the controller 50, with the gate drive circuit 150 configured to receive machine switching control signals (arrow $CC_{45}$) and output gate signals (arrow $CC_{54}$) to the AC switches 54 as part of the method 100.

The controller 50 may also include one or more processors (P)/cores and sufficient tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry. Computer-readable instructions are recorded in memory (M) embodying the present method 100, with the execution of such logic by the processor (P) ultimately causing the controller 50 to manage the flow of electrical power within the electric drive system 15.

The method 100, as applied to FIG. 1, is described below in an embodiment with reference to the table 60 of FIG. 3 and the flow chart of method 100 shown in FIG. 4. In the simplified three-phase embodiment of FIG. 1, twelve of the AC switches 54 are used, i.e., four AC switches 54 per phase leg 48. Mathematically, the number (N) of AC switches 54 in the electric drive system 15 may be represented as $2(n-1)(m)$, where n is the number of winding sections 148 per phase leg 48 and m is the number of phases. So, in the exemplary three-phase embodiment of FIG. 1, where m=n=3, then N=12, i.e., a total of twelve (12) of the AC switches 54 are used to implement the method 100.

Figure 2:
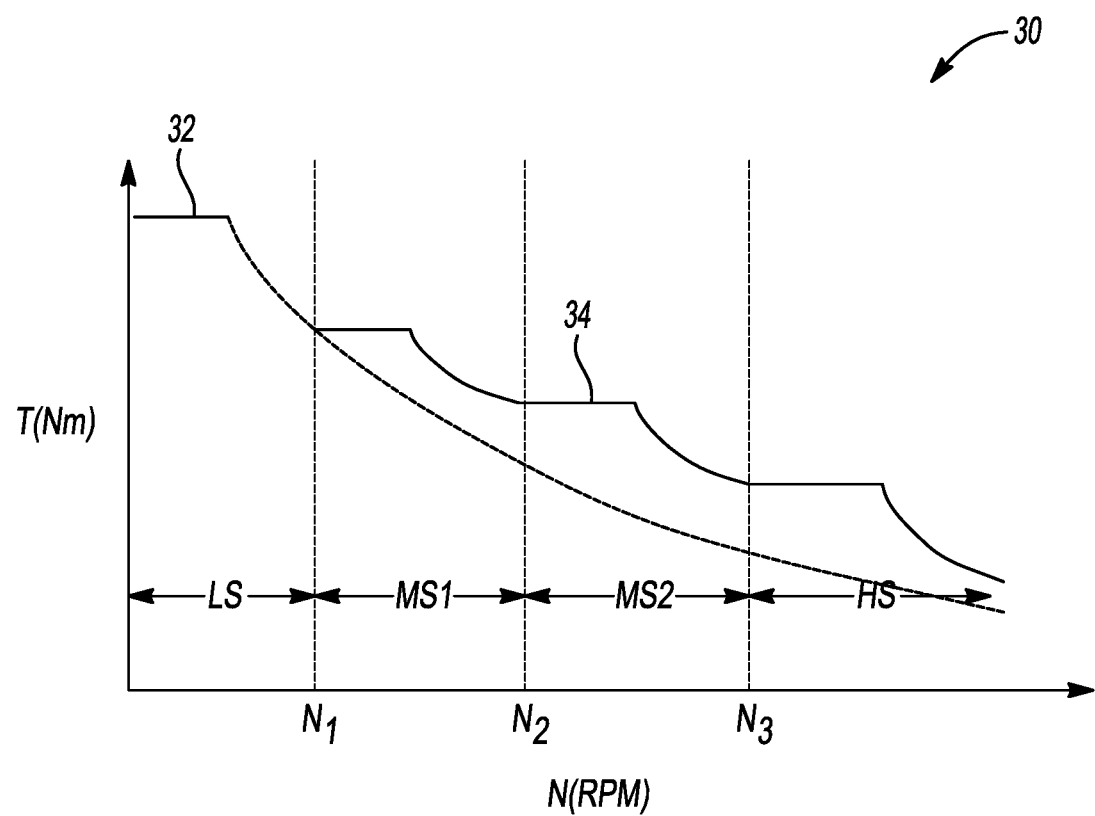
FIG. 2 is a plot of torque versus speed, with speed depicted on the horizontal axis and torque depicted on the vertical axis.

Referring briefly to the torque-speed plot 30 of FIG. 2, the exemplary circuit topology of FIG. 1 enables operation of the electric machine 16 in four speed modes, i.e., a low-speed mode ("LS"), first and second medium-speed modes ("MS1" and "MS2"), and a high-speed mode ("HS"). Output torque ("T") of the electric machine 16 is depicted on the vertical axis in Newton-meters ("Nm"), while rotary speed ("$N_{10}$") is depicted on the horizontal axis in revolutions per minute ("RPM"). Each of the four modes has a corresponding speed threshold, with such thresholds represented as $N_1$, $N_2$, and $N_3$. Additionally, trace 32 represents a baseline torque curve of the electric machine 16 of FIG. 1 without the benefit of the method 100 and the associated switching circuit 45. Trace 34, which is indicative of a resulting torque curve made possible using the present approach, shows a potential increase in torque/power relative to trace 32 as the rotational speed of the electric machine 16 increases. Mathematically, the number of speed-based operating modes ("NSOM") of the electric drive system 15 may be represented as $2^{n-1}$, where once again n is the number of winding sections 148 per phase leg. So, in the exemplary three-phase embodiment of FIG. 1 where n=3, the NSOM=4, with additional NSOM being possible by adding additional winding sections 148 to each phase leg.

A table 60 is shown in FIG. 3 that illustrates the switching states of the AC switches 54 of FIG. 1, which are labeled, left-to-right, as SA11, SB11, SC11, SA12, SB12, SC12, SA21, SB21, SC21, SA22, SB22, and SC22. Speed-based operating modes ("OM") of the electric machine 16 are represented as LS, MS1, MS2, and HS using the convention of FIG. 2 as set forth above. Each operating mode has its own speed threshold. For instance, in the low-speed mode, a first rotary speed of the electric machine 16 may be used to determine when to implement a first ON/OFF switching combination of the AC switches, with progressively higher rotary speeds used for the two medium-speed modes and the high-speed mode. As will be appreciated, a given AC switch 54 conducts electricity when it is in an ON state, i.e., closed. An "X" character is used in table 60 to indicate the conducting state of a corresponding AC switch 54. Likewise, an AC switch 54 is placed in a non-conducting state when it is turned OFF, i.e., when opened. An "O" character is used to represent such a switching state.

In the low-speed ("LS") operating mode, the winding sections 148 located in each respective one of the phase legs 48 of the electric machine 16 are connected to each other in series, as well as to the PIM 40. This requires the parallel-connected AC switches 54 to be opened, i.e., switches SA12, SB12, SC12, SA22, SB22, and SC22. The remaining AC switches 54 are closed. In a three-phase embodiment, for instance, each phase leg 48 would have each of its three respective winding sections 148 connected in series, and thus each of the phase legs 48 are fully energized via the PIM 40.

The first medium-speed mode ("MS1") may be commanded above a first predetermined rotary speed. At least two but fewer than all available winding sections 148 for each respective phase leg 48 are connected in series to each other and to the PIM 40. The AC switches 54 labeled SA12, SB12, SC12, SA21, SB21, and SC21 are commanded open. The remaining AC switches 54 are commanded closed. Winding sections 148 (A1, A3) of phase A, winding sections (B1, B3) of phase B, and winding sections (C1, C3) of phase C are connected in series to the PIM 40 and thereby energized.

The second medium-speed mode ("MS2") may be commanded above an application-specific second rotary speed that is higher than the first rotary speed noted above. As with the first medium-speed mode, at least two but fewer than all available winding sections 148 for each respective phase leg 48 are connected in series to each other and to the PIM 40, with the identity of the particular winding sections 148 in mode MS2 changing relative to mode MS1. The AC switches 54 labeled SA11, SB11, SC11, SA22, SB22, and SC22 are commanded open, and the remaining AC switches 54 are commanded closed. Winding sections 148 (A2, A3) of phase A, (B2, B3) of phase B, and (C2, C3) of phase C are connected in series to the PIM 40 and thereby energized.

In the high-speed ("HS") operating mode, a single winding section 148 for each respective one of the phase legs 48 is connected to the PIM 40. The AC switches 54 labeled SA11, SB11, SC11, SA21, SB21, and SC21 are commanded open. The remaining AC switches 54 are commanded to close. Winding sections 148 (A3) of phase A, (B3) of phase B, and (C3) of phase C are connected to the PIM 40 and thereby energized.

Figure 4:
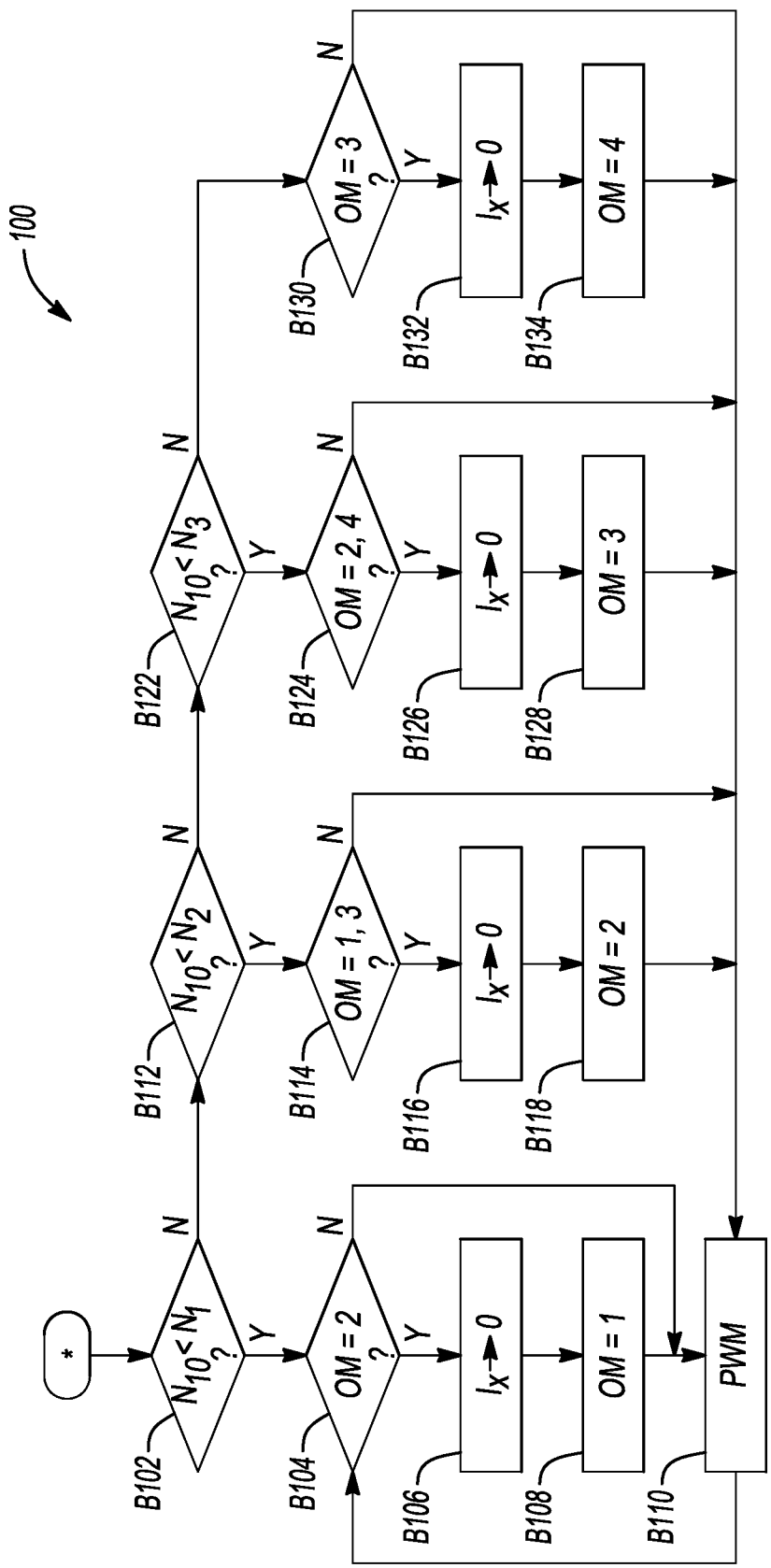
FIG. 4 is a flow chart describing a method for controlling the electric drive systems of FIG. 1.

Referring to FIG. 4, the method 100 is described according to an exemplary embodiment. Upon initiating the controller 50 of FIG. 1 at the onset of method 100, which is represented by "*" in FIG. 1, the controller 50 determines the rotary speed ($N_{10}$), e.g., by measuring a speed of the rotor 16R and/or a road wheel 12 using a rotary encoder as will be appreciated in the art, or by calculating or receiving a requested speed in different embodiments. The controller 50 thereafter compares the rotary speed ($N_{10}$) to a first speed threshold ($N_1$) corresponding to the low-speed operating mode explained above. Such a speed threshold may be pre-recorded in memory (M) of the controller 50 and referenced in real-time by the controller 50. The method 100 proceeds to block B104 if the rotary speed is less than the first speed threshold ($N_1$), and to block B112 in the alternative.

Block B104 includes determining, via the controller 50, whether the electric machine 16 is presently operating in the first medium-speed operating mode, i.e., mode MS1 of FIGS. 2 and 3. The method 100 proceeds to block B106 if the first medium-speed mode is active. The method 100 proceeds in the alternative to block B110 if the electric machine 16 is already operating in the low-speed operating mode.

Block B106 may entail executing a control loop until the phase current in a particular phase leg 48 is zero, or comes within an allowable tolerance thereof, as represented by "Ix→0" in FIG. 6, with the "x" subscript indicating the relevant phase current. The controller 50 may be configured to time opening or closing of the AC switches 54 of the particular phase leg 48 based on a zero-crossing of the phase current.

Such a process may ensure that the winding sections 148 of a particular phase leg 48 are not switched into or out of series with the PIM 40 until the corresponding phase current is zero. That is, even if a command is received to change operating modes, block B106 may include waiting until the phase current is essentially zero before switching control is executed for connecting/disconnecting the constituent winding sections 148. Alternatively, block B106 may not be used, in which case the winding sections 148 are switched on or off regardless of the phase current. Such an embodiment remains viable, albeit with a higher probability of undesirable transient effects. The method 100 then proceeds to block B108.

At block B108, the controller 50 next initiates a transition to the low-speed operating mode by commanding the AC switches 54 ON or OFF as shown in table 60 of FIG. 3. The method 100 then proceeds to block B110.

At block B110, the controller 50 applies switching control logic to the PIM 40 and drives the phase windings 148 in the particular operating mode, the returns to block B102. As block B110 may be arrived at via block B108, block B118, block B128, or block B134, execution of block B110 includes implementing switching control operations of the PIM 40, e.g., PWM, to power the low-speed, first or second medium-speed, or high-speed operating modes, respectively.

At block B112, in a step that is analogous to block B102, the controller 50 determines if the rotary speed ($N_{10}$) is less than a second speed threshold ($N_2$) corresponding to the first medium-speed operating mode explained above. Such a speed threshold may be pre-recorded in memory (M) of the controller 50 and referenced in real-time by the controller 50. The method 100 proceeds to block B114 if the rotary speed ($N_{10}$) is less than the second speed threshold ($N_2$), and to block B122 in the alternative.

Block B114 includes determining, via the controller 50, whether the electric machine 16 is presently operating in the low-speed or second medium-speed modes. If so, the method 100 proceeds to block B116. The method 100 instead proceeds to block B110 if the electric machine 16 is already operating in one of the low-speed or second medium-speed modes.

Block B116, analogously to block B106, entails executing a control loop until current in a particular phase leg 48 is zero, or within an allowable tolerance thereof, to ensure that a winding sections 148 of the particular phase leg 48 is not switched in or out of the circuit until its phase current is zero. As with block B106, block B116 may be omitted if the transient effect tradeoff is acceptable for a given application. The method 100 then proceeds to block B118.

At block B118, the controller 50 next initiates a mode transition to the first medium-speed operating mode by commanding the AC switches 54 ON or OFF according to table 60 of FIG. 3. The method 100 then proceeds to block B110.

At block B122, analogously to blocks B102 and B112, the controller 50 determines if the rotary speed ($N_{10}$) is less than a third speed threshold ($N_3$) corresponding to the second medium-speed operating mode (MS2) explained above. Such a speed threshold may be pre-recorded in memory (M) of the controller 50 and referenced in real-time by the controller 50. The method 100 proceeds to block B124 if the rotary speed ($N_{10}$) is less than the third speed threshold ($N_2$), and to block B130 in the alternative.

Block B124 entails determining whether the electric machine 16 is presently operating in either the first medium-speed mode (MS1) or the high-speed mode (HS). If so, the method 100 proceeds to block B126. The method 100 instead proceeds to block B110 if the electric machine 16 is already operating in the either of the second medium-speed or high-speed operating modes.

Block B126, which is analogous to blocks B106 and B116, entails executing a control loop until the phase current in the phase leg 48 is zero, or within an allowable tolerance thereof, to ensure that a winding section of a particular electrical phase is not switched in or out of the circuit until its phase current is zero. Block B126 may be omitted if the transient effect tradeoff is acceptable for a given application, as noted above. The method 100 then proceeds to block B128.

At block B128, the controller 50 next initiates a transition to the second medium-speed mode (MS2) by commanding the AC switches 54 ON or OFF as shown in table 60 of FIG. 3. The method 100 then proceeds to block B110.

Block B130 includes determining whether the electric machine 16 is presently operating in either the second medium-speed mode (MS2). The method 100 proceeds to block B132 when operating in mode MS2. The method 100 instead proceeds to block B110 if the electric machine 16 is already operating in the second medium-speed operating mode.

Block B132, which is analogous to blocks B106, B116, and B126, entails executing a control loop until the phase current in the phase leg 48 is zero, or within an allowable tolerance thereof, to ensure that a winding section of a particular electrical phase is not switched in or out of the circuit until its phase current is zero. Block B132 may be omitted if the transient effect tradeoff is acceptable for a given application, as noted above. The method 100 then proceeds to block B134.

At block B134, the controller 50 next initiates a transition to the high-speed mode (HS) by commanding the AC switches 54 ON or OFF as shown in table 60 of FIG. 3. The method 100 then proceeds to block B110.

The method 100 as described above as used with the electric drive system 15 of FIG. 1 is intended to provide improved power and efficiency under partial load conditions relative to existing approaches. That is, the controller 50 is configured to command a binary switching state of each respective one of the AC switches 54 based on the rotary speed ($N_{10}$) of the electric machine 16 to thereby implement one of three different speed-based operating modes, and to thereby vary a conductive path from the PIM 40 to the electric machine 16 through the winding sections 148. The controller 50 thus automatically reconfigures the phase legs 48 based on the rotary speed of the electric machine 16 such that full phase windings/phase legs 48 are used at low rotary speeds of the electric machine 16 to increase machine torque relative to baseline performance, as shown in the plot 30 of FIG. 2. Partial windings/phase legs 48 are used at two medium rotary speeds of the electric machine 16 to increase power and efficiency, with a single winding section 148 used at the highest speeds. The method 100 therefore provides a solution to the problem of the tradeoff between peak torque and high-speed power due to back-electromotive force ("back-EMF") of the electric machine 16 when approaching the bus voltage as the rotational speed of the electric machine 16 increases.

In either of the illustrated topology of FIG. 1, the AC switches 54 may be integrated or packaged in a few different ways. Ideally, the AC switches 54 are integrated into the structure of the electric machine 16, e.g., into the phase windings or phase legs 48 thereof. In such a configuration, the PIM 40 may be an off-the-shelf power inverter device, and as such may be connected directly to the individual phase leads of the electric machine 16 in the usual manner.

However, in order to facilitate use of the present teachings with an available configuration of the electric machine 16, the AC switches 54 and the winding sections 148 may be packaged in a switching box forming the switching circuit 45 of FIG. 1, which in turn may be electrically connected to the PIM 40 and the electric machine 16 to facilitate construction of the electric drive system 15. As another alternative, the AC switches 54 and the winding sections 148 may be integrally formed with the PIM 40, with the PIM 40 configured in such a manner connecting to the phase leads of the electric machine 16 in the usual manner.

Likewise, the winding sections 148 may have a predetermined turn ratio configured to provide a predetermined power or torque from the electric machine 16. Such an approach may also be used to help differentiate medium-speed modes MS1 and MS2 from each other. For instance, when the electric machine 16 is a three-phase electric machine having first, second, and third winding sections 148 in each of its three of the phase legs 48, with the first winding section 148 being closest to the PIM 40 as shown in FIG. 1, the predetermined turn ratio of the respective first, second, and third winding sections may be 2:1:1. Thus, the order of winding sections 148 energized at a particular speed point of the electric machine 16 and/or the motor vehicle 10 of FIG. 1 is changed by the reconfigurable windings of the electric machine 16 to vary the conductive path from PIM 40 to the electric machine 16. These and other possible advantages of the present approach will be readily appreciated by those of ordinary skill in the art in view of the forgoing disclosure.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed is:

1. An electric drive system comprising:
a direct current ("DC") battery pack;
a polyphase electric machine having three or more phase legs;
a power inverter module ("PIM") having a DC-side connected to the battery pack, and an alternating current ("AC")-side connected to the electric machine;
a switching circuit including:
a plurality of AC switches; and
for each of the phase legs, three or more winding sections each electrically connectable to or disconnectable from the PIM by operation of the AC switches, wherein for each respective one of the phase legs:
one of the winding sections is a distal winding section relative to the PIM; and
each of the winding sections, other than the distal winding section, is connected in series and in parallel with a respective first and second AC switch, wherein the first AC switch and the second AC switch are part of the plurality of AC switches; and
a controller configured to command a binary ON/OFF switching state of each respective one of the AC switches based on a rotary speed of the electric machine to thereby implement one of four different speed-based operating modes, including a low-speed operating mode, separate first and second medium-speed operating modes, and a high-speed operating mode, and to thereby vary a conductive path from the PIM to the electric machine, and wherein:
in the low-speed operating mode, all of the winding sections in each respective one of the phase legs are connected in series to each other and to the PIM at a first rotary speed of the electric machine via a first ON/OFF switching combination of the AC switches;
in the first and second medium-speed operating modes, at least two but fewer than all of the winding sections for each respective one of the phase legs is connected to the PIM at progressively-higher second and third rotary speeds of the electric machine, respectively, via a respective second and third ON/OFF switching combination of the AC switches; and
in the high-speed operating mode, only one of the winding sections in each respective one of the phase legs is connected to the PIM above the third rotary speed of the electric machine via a fourth ON/OFF switching combination of the AC switches.

2. The electric drive system of claim 1, wherein the electric machine has three or more of the phase legs, and wherein the electric drive system includes three or more of the winding sections for each of the phase legs and at least twelve of the AC switches.

3. The electric drive system of claim 1, wherein the AC switches are Gallium nitride ("GaN"), Gallium oxide ("GaO"), or Silicon carbide ("SiC") switches.

4. The electric drive system of claim 1, wherein the controller is configured to time an opening or a closing of the AC switches based on a zero-crossing of a phase current of the electric machine.

5. The electric drive system of claim 1, wherein the winding sections have a predetermined turn ratio configured to provide a predetermined power or torque from the electric machine.

6. The electric drive of claim 5, wherein the electric machine is a three-phase electric machine having first, second, and third winding sections in each of three of the phase legs, the first winding section being closest to the PIM and the third winding section being the distal winding section, and wherein the predetermined turn ratio of the respective first, second, and third winding sections is 2:1:1.

7. The electric drive system of claim 1, wherein the electric machine has at least four times as many of the AC switches as a number of the winding sections in each respective one of the phase legs.

8. The electric drive system of claim 7, wherein a number of the AC switches is $N=2(n-1)(m)$, where (n) is the number of the winding sections in each of the phase legs, and (m) is the total number of the phase legs.

9. The electric drive system of claim 8, wherein a number of the speed-based operating modes is equal to $2^{n-1}$.

10. The electric drive system of claim 1, further comprising a set of road wheels of a motor vehicle, wherein the electric machine is coupled to at least some of the set of road wheels and configured to propel the vehicle via rotation of the road wheels.

11. The electric drive system of claim 1, wherein the AC switches are integrated within the electric machine.

12. A method for controlling a polyphase electric machine in an electric drive system, the electric machine having at least three phase legs, the method comprising:
providing, between a power inverter module ("PIM") and the electric machine, a plurality of alternating current ("AC") switches and, for each of the three phase legs of the electric machine, three or more series-connectable winding sections;
determining a rotary speed of the electric machine via a controller; and
commanding a binary switching state of each respective one of the AC switches based on the rotary speed to thereby implement one of four different speed-based operating modes of the electric machine, and to thereby vary a conductive path from the PIM to the electric machine, wherein the four different speed-based operating modes include:
a low-speed operating mode in which all of the winding sections are connected for each respective one of the phase legs to the PIM below a first rotary speed of the electric machine via a first ON/OFF switching combination of the AC switches;
first and second medium-speed operating modes in which at least two but fewer than all of the winding sections for each respective one of the phase legs are connected in series to each other and to the PIM above the first rotary speed and below a respective second and third rotary speed of the electric machine via a second ON/OFF switching combination of the AC switches; and
a high-speed operating mode above the third rotary speed in which only one of the winding sections for each respective one of the phase legs is connected to the PIM via a third ON/OFF switching combination of the AC switches.

13. The method of claim 12, wherein the AC switches are Gallium nitride ("GaN"), Gallium oxide ("GaO"), or Silicon carbide ("SiC") switches.

14. The method of claim 12, further comprising timing an opening or closing of the AC switches based on a zero-crossing of a phase current of the electric machine.

15. The method of claim 12, wherein a number of the AC switches is $N=2(n-1)(m)$, where n is the number of the winding sections in each of the phase legs, and (m) is the total number of the phase legs.

16. The method of claim 15, wherein a number of the speed-based operating modes is $2^{n-1}$.

17. The method of claim 15, wherein the electric machine has at least three of the phase legs and the electric drive system has at least twelve of the AC switches, and wherein each of the phase legs has at least three of the winding sections.

18. The method of claim 12, wherein the electric drive system is coupled to a set of road wheels of a motor vehicle, the method further comprising powering the road wheels via the electric machine to thereby propel the motor vehicle.

* * * * *